United States Patent [19]

Hoppe et al.

[11] 4,195,458

[45] Apr. 1, 1980

[54] HARDENABLE COMPOSITIONS OF IMPROVED THERMAL STABILITY

[75] Inventors: Walter Hoppe, Windeck-Schladern; Hans Jünger, Troisdorf; Franz Weissenfels, Siegburg, all of Fed. Rep. of Germany

[73] Assignee: Dynamit Nobel Aktiengesellschaft, Troisdorf, Fed. Rep. of Germany

[21] Appl. No.: 776,557

[22] Filed: Mar. 10, 1977

Related U.S. Application Data

[60] Continuation of Ser. No. 622,348, Oct. 14, 1975, abandoned, which is a division of Ser. No. 546,832, Feb. 3, 1975, Pat. No. 4,036,798.

[30] Foreign Application Priority Data

Feb. 14, 1974 [DE] Fed. Rep. of Germany ....... 2406992

[51] Int. Cl.² .............................................. C08K 3/40
[52] U.S. Cl. .................................. 52/234; 106/38.22; 260/28 P
[58] Field of Search .............. 52/234; 106/38.22, 38.9; 260/28 P, 38

[56] References Cited

U.S. PATENT DOCUMENTS

| 2,790,722 | 4/1957 | Kohl | 106/38.22 X |
| 2,892,227 | 6/1959 | Operhall | 106/38.9 X |
| 3,032,425 | 5/1962 | Leach | 106/38.9 X |
| 3,046,147 | 7/1962 | Hathaway et al. | 106/38.9 |
| 3,137,586 | 6/1964 | Pry | 106/38.9 X |

*Primary Examiner*—John E. Murtagh
*Attorney, Agent, or Firm*—Sprung, Felfe, Horn, Lynch & Kramer

[57] ABSTRACT

A composition comprising a granular inorganic oxidic material other than glass powder and 1 to 30 weight percent, based on the weight of said material, of glass powder, especially a composition additionally containing a hardenable thermo- or cold-setting phenolic resin, which composition does not disintegrate at high temperatures and retains compressive strength.

21 Claims, No Drawings

HARDENABLE COMPOSITIONS OF IMPROVED THERMAL STABILITY

This is a continuation of application Ser. No. 622,348, filed Oct. 14, 1975, now abandoned which, in turn, is a division of application Ser. No. 546,832, filed Feb. 3, 1975, now U.S. Pat. No. 4,036,798.

BACKGROUND OF THE INVENTION

1. Field of the Invention

This invention relates to compositions containing granular inorganic oxidic materials which resist the adverse effects of high temperatures and which retain at temperatures above 500° C. compressive strength. This invention is particularly directed to compositions containing a granular inorganic oxidic material which at temperatures above 500° C. have increased compressive strength. This invention is also directed to the use of such compositions as plugs for tapping holes in vessels employed for metallurgical refining and in fabricated products, particularly those used in the construction industry, including partitions, facings and the like.

2. Discussion of the Prior Art

It is known to prepare moldings and compositions which consist of oxidic, inorganic additives, such as quartz gravel, quartz flour, or inorganic light substances such as expanded clay, expanded mica, expanded shale and so forth, and of a binder consisting of a thermoset such as phenolic resin, epoxy resin, polyester resin and the like, and which are used as building materials, in residential construction, for example. It has also been proposed to use these compositions in conjunction with tar binding agents as ramming compositions or as trough lining compositions and tap hole plugging compositions in metallurgical installations, e.g., for the lining of molds or of troughs.

The thermosetting and/or acid setting compositions that have become known hitherto on the basis of hard, granular, inorganic oxidic substances bound by phenolic resins, however, result in hardened products, for residential construction and for hardened linings and seals for metallurgical purposes, for example, which have a number of important disadvantages.

The organic binder in the hardened moldings or linings or seals has the property of becoming more or less completely pyrolyzed or coked or converted to ash under the prolonged direct action of flame or merely under the prolonged action of elevated temperatures. Even flame-resistant organic binding agents have this disadvantage. Accordingly, the fabricated products disintegrate more or less rapidly under the action of fire and/or heat, depending on the temperature and duration of such action, because the burning of the synthetic resin binding agent greatly diminishes or completely destroys their cohesion, i.e., their stability of shape, and their compressive strength.

The term "fabricated products" as used herein is to be understood to refer to construction materials such as partitions, facings and the like in home construction, and linings and seals for metallurgical installations, such as linings for troughs and molds as well as tap hole plugs and the like, in the hardened state.

To improve the stability of shape of hardened construction materials made from hard, granular inorganic oxide materials, especially porous ones, under the action of fire and/or high temperatures, it has previously been proposed to add alkali silicates, silicic acid esters, boric acids and their salts, triphenylborate, or other boron compounds which bind themselves to metal oxides under the action of heat and, in some cases, pressure, to mixtures containing phenolic resins, for example, as binding agents, before they are fabricated and hardened (German "Offenlegungsschrift" No. 1,571,399).

In these known construction materials, especially when porous hard materials are used as additives, it is disadvantageous that their compressive strength decreases under the action of heat and/or fire.

It is indeed possible to improve sound insulating properties by replacing the porous hard materials with non-porous hard materials as additives. By such measures the compressive strength of the hardened construction materials is improved. Nevertheless, it has hitherto been impossible to achieve the objective of replacing a partition built up by conventional methods of approximately 12.0 centimeter bricks with a partition approximately 3 to 5 cm thick having approximately the same heat and fire resistance and made of the previously known thermosetting and/or acid-setting compositions containing inorganic oxide additives and a binding agent of phenolic resin.

When hardenable compositions are used for metallurgical purposes, e.g., as compositions which can be rammed onto troughs or compositions for the lining of the inner surfaces of ingot molds or for tap hole plugging compositions, it is desirable to have sufficiently great stability of shape combined with compressive strength in the fabricated products under the action of heat or flame, as the case may be. The molten metals with which the compositions or fabricated products come into contact, in the tapping of a blast furnace for example, are usually at temperatures greater than 500° C. up to about 1800° C. The thermal stress is thus substantially greater than it is in a burning house, for example (in a residential fire the temperatures are generally reckoned at up to 800° C., though the temperatures locally may be lower, e.g., below 500° C.).

The fabricated products made from the known compositions, however, do not meet these requirements, since their compressive strength and their stability of shape are insufficient at the high temperatures involved.

The life of protective coatings in troughs or molds, when made from the compositions heretofore known, is relatively short. In most cases, cracking and spalling or partial decomposition is found after as little as a single use, so that the linings have to be renewed.

Especially problematical is the use of the previously known thermosetting compositions of the above-named type as tap hole plugging compositions. Tap hole plugging compositions have to meet particularly high requirements in practice. On the one hand, after they have set, they must withstand the high ferrostatic pressures and the relatively high temperatures (usually over 1000° C.) without disintegrating. They must shrink as little as possible. On the other hand, the plugs must be removable at the end of the smelting process. Consequently, they must not be excessively resistant to pressure. Thus, they must have maximum strength in order to withstand the pressures and temperatures prevailing in the metallurgical vessel.

Accordingly, it is an object of the present invention to provide a composition which can be employed in the construction industry which does not burn or disintegrate or lose its compressive strength substantially upon being subjected to temperatures, say, of 500°–1000° C. It is another object of the invention to provide a hardenable composition which can be used in the metallurgical industry as a ramming composition for troughs or as a liner for inner surfaces of ingot molds or as a plug for a tap hole, which composition does not disintegrate or substantially lose its compressive strength when subjected to temperatures of 500°–1800° C. It is a particular object of the invention to provide a hardenable composition whose compressive strength will increase when it is subjected to temperatures above 500° C.

SUMMARY OF THE INVENTION

These and other objects of the invention are provided by a composition comprising a granular inorganic oxidic material other than glass powder and 1 to 30 weight percent, based on the weight of said material, of glass powder. The composition of the present invention can also contain a hardenable thermo- and/or cold-setting composition, particularly a hardenable phenolic resin, especially a hardenable phenolic resin of the novolak type. In accordance with the invention it has been discovered that if inorganic oxidic compositions in granular form are modified by the inclusion of 1 to 30 weight percent of glass powder, the composition has a surprising resistance to the degradative effects of temperatures above 500° C. Thus, it has been found that whereas compositions comprising a major amount of granular inorganic oxidic material and a hardenable resin will disintegrate at temperatures of 500° C., a composition which additionally contains 1 to 30 weight percent of a glass powder will resist disintegration. Depending on the amount of glass powder included in the composition, the compressive strength can actually increase at temperatures above 500° C.

There are provided, in accordance with this invention, compositions which when hardened form fabricated products of high density and improved stability of shape and compressive strength, and which also during and after the application of heat and/or pressure have minimum strengths such as those required in applications in which the compositions or fabricated products are or may be exposed to temperatures of approximately 500° to 1800° C.

The problems inherent in prior art compositions are solved in accordance with the present invention by including into the granular inorganic oxide composition 1 to 30 weight percent of a glass powder. It should be understood that the term "inorganic oxide material", as used herein, contemplates granular inorganic oxide materials other than the powdered glass additive. Thus, the term specifically contemplates materials such as quartz sand and the like as more specifically set forth below. It should be understood that this invention is also directed to the use of such modified compositions for the production of fabricated products.

Suitable hard, granular inorganic oxide materials are those having a hardness greater than 6, and preferably of 7 to 9 on the Mohs scale of hardness. Quartz sands of various origins are used preferentially. However, other sands of mineral origin may be used, such as zirconium sand or sands containing, in addition to $SiO_2$ and alkali oxides, $Al_2O_3$ and/or MgO and/or CaO, and other such sands. Synthetic granular hard substances can be used, such as fused mullite, fused spinel, electrocorundum and the like. Mixtures of "mineral" sands with synthetic hard substances can also be used. "Mineral" in the content of "mineral sands" refers to $SiO_2$-containing natural sands being resistant to high temperatures.

Fundamentally, porous inorganic oxide hard materials can also be used or added, such as for example expanded clay, expanded mica, expanded shale and the like, if good thermal insulation is to be achieved, in building materials for example, such as in the outside walls of a house. In partition wall components, however, it is desirable, for better sound insulation, not to use porous hard materials. In the case of compositions which are to be used for metallurgical purposes, it is also desirable to avoid the use of porous hard materials, so as to achieve the greatest possible density and thermal stability in the fabricated product.

The grain size of the hard, inorganic oxide substances can vary widely and is broadly between 0.05 and 1.0 mm. Preferred are grain sizes ranging from about 0.5 to 0.1 mm, it being possible to use individual grain size fractions within this range or mixtures of grain size fractions.

In some cases, however, more coarsely granular hard materials can be used, e.g., those of grain sizes ranging from 1 to 0.5 mm. For many applications a quartz sand of the following grain size distribution proves desirable:

1 to 15 weight percent, especially 8 weight percent=0.1 to 0.2 mm 40 to 80 weight percent, especially 63 weight percent=0.2 to 0.315 mm 10 to 50 weight percent, especially 29 weight percent=larger than 0.315 mm.

A great variety of pulverized glasses can be used as the powdered glass. For the purpose of the invention, for example, those glasses which contain about 12 to 18 weight percent alkali oxides and about 10 to 30 weight percent alkaline earth oxides are suitable, the balance consisting essentially of $SiO_2$ and, if desired, subordinate amounts of other metal oxides.

A preferred embodiment of the invention consists in using those glass powders which soften at temperatures of approximately 600° to 1000° C., preferably at about 800° C.

A glass powder having a grain size distribution of >0 to 100 microns is used preferentially. Individual grain size fractions within this range can also be used. Fundamentally it is also possible to use coarser glass powders, such as for example those having a grain size distribution of 100 to 200 microns.

DESCRIPTION OF PREFERRED EMBODIMENTS

The composition of the present invention desirably employs a hardenable resin such as a hardenable thermosetting and/or cold-setting resin, particularly a hardenable phenolic resin of the novolak type. The phenolic resin binding agent which can be used in accordance with the invention can be any phenolic resin of the resol type in solid, powder, liquid or dissolved form, or also novolak-hexamethylenetetramine mixtures in the dissolved or powdered state.

Suitable phenolic resins of the resol type are obtained, for example, by the condensation of one mole of a phenol with one to three moles of aldehydes in an alkaline medium, followed by vacuum distillation of the water and, in some cases, adjustment of the pH value to a value greater than 4. The phenols may be not only phenols but also their homologs such as the cresols and resorcinols, and xylenols, or mixtures of these compounds. The aldehydes which react with the phenols include, among others, formaldehyde, compounds which break down to formaldehyde such as paraformaldehyde or trioxane, acetaldehyde, furfurol and hexamethylenetetramine, etc., and mixtures of these compounds. The condensation is performed in an aqueous, alkaline medium. The resols can be used in solid form, in aqueous liquid form, or in alcoholic solution.

Phenolic resins of the novolak type are obtained, for example, by condensing a phenol with an aldehyde in a molar ratio of 1:0.75 to 1, in the presence of acids such as sulphuric acid, oxalic acid, hydrochloric acid, dilute hydrochloric acid or acid salts. The water that is split off is removed by distillation in vacuo.

The setting of the novolaks is best performed by the addition of hexamethylenetetramine or other formaldehyde yielding substances at temperatures above 100° C. The setting of the phenolic resins of the resol type can be performed by the action of heat, the temperatures generally ranging from 100° to 180° C. They may also be set, however, by acids alone or with the simultaneous input of heat at temperatures lower than 25° C. In general, acids are used, such as for example mineral acids, formic acid, acetic acid, oxalic acid, water-soluble sulfonic acids in which the sulfonic acid group is attached directly to an aromatic ring, which can be substituted if desired. Examples are: benzenesulfonic acid, p-toluenesulfonic axid, chlorobenzene-3,5-disulfonic acid, bromobenzene-4-sulfonic acid, ortho-, meta and para-cresolsulfonic acids or aniline-2,5-disulfonic acid. The sulfonic acid group can also be linked to a polynuclear aromatic radical, as in the case, for example, of the naphthenesolfonic acids or the naphthylaminesulfonic acids.

The aqueous solutions of these acids are used mainly as 20 to 70 weight percent solutions. A number of acids, such as p-toluenesulfonic acid for example, can also be used in pulverized form as a hardener. The amount of hardener used generally ranges between 1.0 and 15.0 weight percent, preferably 1 to 5 weight percent, reckoned as 100% acid, with respect to the solid content of the phenolic resin.

The hardening can be performed during or after the shaping operation, either at elevated pressure or at normal pressure.

For the preparation of the compositions of the invention, the additives that are to be used (granular, inorganic oxide hard materials plus powdered glass) and other additives if desired, such as, for example, hardeners, fluxes and the like, are intimately mixed with the resols or novolaks in suitable mixing means, such as kneaders or roller mixers or concrete mixers. The proportion of the phenolic resin to be put in is best selected such that the ratio of phenolic resin (determined as solid resin) to inorganic oxide materials amounts to from 1 to 20:99 to 80 percent by weight, preferably from 3 to 8:97 to 92 percent by weight. If desired, the mixing units can be heated.

The composition can then be compressed in molds, preferably steel molds, and hardened at about 80° to 250° C., preferably 150° to 170° C., either at elevated pressure, e.g., more than 150 kp/cm$^2$, or at normal pressure, to form the fabricated products such as structural components for wall elements or facings in residential construction. The hardening time will depend on the reactivity of the binding agent, on the setting temperature, in some cases on the concentration of the hardener and on the wall thickness of the fabricated product. Roughly speaking, the hardening time will generally amount to about one minute per millimeter of wall thickness.

In the lining of a trough in metallurgical furnaces or in the lining of casting molds made, for example, of chamotte, a slightly moist to free-flowing mixture of the resols or novolaks is tamped with tar pitch binding agents, the additives used in accordance with the invention, and a hardener if necessary, onto the surface to be protected, in the desired thickness. The hardening can take place then and there before the lining is put in operation, e.g., when phenol resins of the resol type are used, by heating the coating to the setting temperature, e.g., 130° to 170° C. at normal pressure. In many cases it is not essential to perform the complete hardening before the lining is put in operation, if the hardening takes place with an input of heat. The hot material flowing through the trough or into the mold will within a short time harden the coating during operation. This procedure can be applied accordingly also to the sealing of a tap hole of metallurgical furnaces, and to tamping or ramming compositions for metallurgical purposes in general, wherever the compositions are subjected to the action of heat during use.

Surprisingly, the addition of 1 to 30 weight percent of powdered glass in accordance with the invention permits the production of fabricated products capable of withstanding the action of heat and having a high density, high stability of shape and great compressive strength. As it will be shown by the examples, the compressive strengths are still very high even after three hours of heating at 1000° C., while fabricated products which do not contain this additive and which are heated under the same conditions disintegrate.

Especially surprising is the effect of the addition of 10 parts glass powder by weight. A compressive test specimen on the basis of 100 parts quartz sand, 10 parts glass powder by weight and 2.5 weight parts of a phenol formaldehyde resin (approximately 72% solid resin content, viscosity about 800 cP) has a compressive strength of 35 kp/cm$^2$ after 45 minutes of exposure to a heat of 160° C. After three hours of heating at 1000° C., the compressive strength, however, rises to 111 kp/cm$^2$. An improvement of the compressive strength of fabricated products after exposure to heat has been impossible to achieve with the compositions known hitherto.

The compositions of the invention are especially capable of good use, on account of the high resistance to heat of fabricated products made therefrom, in those applications in which minimum compressive strengths during or after the action of high temperatures—temperatures of about 800° C. to 1800° C.—are required to such fabricated products. They can therefore be used as ramming compositions, for example, for backfilling metallurgical furnaces or for the lining of troughs or ingot molds, or for tap hole plugging compositions and the like. If desired, a portion of the phenolic resin binding agent can be replaced by another organic binding agent such as tar pitch, in these applications.

An additional advantage of the compositions of the invention consists in the fact that, by varying the quantity ratios of the essential components of the mixture, i.e., the glass powder, the granular inorganic oxide materials and the phenolic resin, the products made therefrom can be adapted to quite specific minimum strengths or also to quite specific maximum strengths. Such adaptation of the compositions to the requirements which they have to meet in use is especially important in the case of tap hole plugging compositions. For example, compounds composed of 5 weight percent glass powder, 90 weight percent quartz sand and 5 weight percent phenolic resin have proven valuable in practice, the phenolic resin being able to be replaced with a mixture of phenolic resin and tar pitch if desired, depending on the application. However, compositions which contain at least 10% by weight of glass powder are characterized by having increased compressive strength after being subjected to temperatures of 1000° C., e.g., after being subjected to temperatures of 1000° C. for three hours.

For many applications it is desirable to add to the compositions, in addition to the granular inorganic oxide materials and the glass powder, fluxes such as powdered boron compounds, such as for example boric acids, boron trioxide, alkali or alkaline earth borates, or mixtures of same.

The preferred boron compound is sodium tetraborate. Surprisingly, when 0.1 weight part of sodium tetraborate is added to a mixture of 100 weight parts of quartz sand, 2.5 weight parts phenolic resin (solid resin content 72 weight percent) and 1 part by weight of glass powder, the compressive strength of a test specimen heated for three hours at 1000° C. is five to eight times higher than the compressive strength of a test specimen which does not contain this addition of sodium tetraborate.

As an advantageous embodiment of the invention, therefore, compositions are proposed which additionally contain 0.1 to 3.5 weight percent of inorganic boron compounds, preferably sodium tetraborate, with respect to the hard, granular inorganic oxide substances.

If desired, instead of the boron compounds or in addition thereto the compositions of the invention can contain alkali carbonates, preferably sodium carbonate, in amounts of 0.1 to 5% of the weight of the hard granular inorganic oxide substances. For example, the compressive strength of a test specimen based on a mixture of 100 weight parts of quartz sand, 2.5 weight parts of phenolic resin (solid resin content about 72 weight percent), 5 weight parts of powdered glass and 3.5 weight parts of sodium carbonate is 13 kp/cm$^2$ higher after three hours of heating at 1000° C. than the compressive strength of a test specimen of the same mixture components without the addition of the sodium carbonate. The addition of the alkali carbonates brings with it the advantage that they diminish the melt viscosities of the compositions of the invention, if desired. In the case of the thermosetting compositions (without the addition of acid) the use of alkali carbonates is preferred.

The compositions containing boron and/or alkali carbonates are preferentially used for the manufacture of those fabricated products in which temperatures of less than about 800° C. might be produced by the action of flames and/or heat. Temperatures of less than about 800° C. can be observed, at least locally, in the burning of a house. For reasons of safety, it is therefore desirable to use, especially for internal partition walls in residential construction, those compositions which soften below the softening ranges of the glass powders used. The lowering of the softening range or of the melt viscosity, as the case may be, can be achieved by the addition of the inorganic boron compounds and/or alkali carbonates. In this manner it is possible to prevent wall elements from collapsing prematurely due to the fact that the organic binding agent, namely the phenolic resin, is partially or completely burned up before its binding function can be taken over by the inorganic components, for it is theorized that the glass powder, plus the boron compounds and/or the alkali carbonates, if used, combines with components of the hard granular inorganic oxide substances to form flame-resistant and heat-resistant, enamel-like substances which largely take over the binding function of the hardened organic binding agent during or after the destruction of the latter by combustion.

Therefore, for the production of building materials, especially of internal partition walls, face paneling and the like, those thermosetting and/or acid-setting compositions on the basis of hard granular inorganic oxide substances bound by phenolic resins in accordance with the invention are preferred which contain inorganic boron compounds and/or alkali carbonates in the stated amount in addition to the glass powder.

As hard granular inorganic oxide substances for internal partition walls, non-porous hard substances are preferred, especially quartz sand.

The wall components prepared from such compositions are very compression-resistant after they have set, and they have a high density. In their compressive strength and in their density, both after and during the action of flames or heat, they are superior to the previously known wall components prepared in a similar manner. Their sound insulating qualities are good. On account of their high compressive strength and sound stopping qualities, they are able with a thickness of 4 cm, for example, to replace a conventional masonry brick wall of a thickness of about 12.0 cm.

If, for example, construction materials of higher thermal insulation are required, it is basically possible to use porous granular inorganic oxide substances such as expanded clay, expanded shale, expanded mica and the like instead of or together with the non-porous granular inorganic oxide substances, preferably quartz sand.

In order to more fully illustrate the nature of the invention and the manner of practicing the same, the following examples are presented.

EXAMPLES

The following raw materials were used:
1. Quartz sand (source: Haltern; type H 32); Grain size distribution: 8 wt.-% 0.1 to 0.2 mm; 63 wt.-% 0.2 to 0.315 mm; 29 wt.-% larger than 0.315 mm.
2. A liquid phenol-formaldehyde resin (phenol-resol resin) obtainable commercially under the name "Phenolharz T 77" and having a solid resin content of about 72 wt.-% and a viscosity of approximately 800 cP.
3. A powdered glass of a fineness of 0 to 100 microns.
4. Finely powdered sodium tetraborate.
5. Anhydrous, pulverized sodium carbonate.

EXAMPLES 1-5

The experimental data and findings listed in Table 1 clearly show the effect achieved by the invention.

The experiments were performed as described herewith: H 32 quartz sand, phenolic resin binding agent and the additives of the invention in the form of powdered glass, plus boron compounds and alkali compounds in some cases, were mixed intimately together in a suitable mixer, such as a concrete mixer, for 10 minutes, and 6 compressive testing specimens 50 mm in diameter and 65 mm long with a density of approximately 1.50 g/cm$^3$, were prepared from each of the mixtures using a GF ramming and molding apparatus. The specimens were hardened in a circulating air oven at atmospheric pressure with heat alone at 150°–170° C.

After cooling, the compressive strength of 3 specimens was tested by means of a GF compressive testing apparatus. The other 3 test specimens of the same raw material mixture were placed in a muffle furnace for 3 hours at about 1000° C. and after cooling they were tested for residual compressive strength and dimensions (stability of shape).

TABLE 1

| Experimental Example No. | | 1 | 2 | 3 | 4 | 5 | 6 |
|---|---|---|---|---|---|---|---|
| Composition of Test Specimens | | | | | | | |
| Sand H 32 | (kg) | 100 | 100 | 100 | 100 | 100 | 100 |
| Phenolic resin T 77 | (kg) | 2.5 | 2.5 | 2.5 | 2.5 | 2.5 | 2.5 |
| Glass powder | (kg) | — | 5.0 | 10.1 | 1 | 1 | 5.0 |
| Sodium tetraborate | (kg) | — | — | — | — | 0.1 | — |
| Sodium carbonate | (kg) | — | — | — | — | — | 3.5 |
| Characteristics of the Test Specimens | | | | | | | |
| Compressive strength (after 45 minutes at 160° C.) | (kg/cm$^2$) | 140 | 140 | 35 | 140 | 140 | 140 |
| Compressive strength (after 3 hours at 1000° C.) | (kp/cm$^2$) | disintegrated | 67 | 111 | 3 | 20 | 80 |
| Density direct/ density after 3 hours at 1000° C. | (g/cm$^3$) | disintegrated | 1.56 / 1.51 | 1.56 / 1.51 | 1.56 / 1.51 | 1.56 / 1.51 | 1.56 / 1.51 |
| Dimensions: diameter/height(mm) direct | | 65 mm | 65 mm | 65 mm | 65 mm | 65 mm | 65 mm |
| (after 3 hours at 1000° C.) | | disintegrated | 65 mm | 65 mm | 65 mm | 65 mm | 65 mm |

What is claimed is:

1. A building structure having an exterior wall, said exterior wall containing a hardened composition, said composition comprising a quartz sand material and 1 to 30 weight percent of glass powder and 1 to 20 weight percent, based upon the weight of said material, of a hardenable thermo- or cold-setting phenolic resin.

2. A structure according to claim 1 wherein said composition additionally contains 0.1 to 3.5%, based on the weight of said material, of an inorganic boron compound in powder form.

3. A structure according to claim 2 wherein said boron compound is sodium tetraborate.

4. A structure according to claim 1 wherein said composition additionally contains 0.1 to 5 weight percent, based on the weight of said material, of an alkali carbonate.

5. A structure according to claim 4 wherein said alkali carbonate is sodium carbonate.

6. A structure according to claim 1 wherein the glass powder has a particle size up to 100 microns.

7. A structure according to claim 1 wherein said resin is a novolak resin.

8. A structure according to claim 1 wherein said resin is present in a weight ratio of 3 to 8:97 to 92 to said material.

9. A structure according to claim 1 wherein said composition additionally contains a tar pitch.

10. A structure according to claim 1 wherein said glass powder is present in an amount of at least 10% by weight.

11. A structure according to claim 1 wherein said glass powder is present in an amount of at least 5 percent based upon the weight of said material and said glass powder has a particle size up to 100 microns.

12. A building structure having partition walls defining rooms, said partition walls containing a hardened composition, said composition comprising a quartz sand material and 1 to 30 weight percent of glass powder and 1 to 20 weight percent, based on the weight of said material, of a hardenable thermo- or cold-setting phenolic resin.

13. A structure according to claim 12 wherein said composition additionally contains 0.1 to 3.5%, based on the weight of said material, of an inorganic boron compound in powder form.

14. A structure according to claim 13 wherein said boron compound is sodium tetraborate.

15. A structure according to claim 12 wherein said composition additionally contains 0.1 to 5 weight percent, based on the weight of said material, of an alkali carbonate.

16. A structure according to claim 15 wherein said alkali carbonate is sodium carbonate.

17. A structure according to claim 12 wherein the glass powder has a particle size up to 100 microns.

18. A structure according to claim 12 wherein said resin is a novolak resin.

19. A structure according to claim 12 wherein said resin is present in a weight ratio of 3 to 8:97 to 92 to said material.

20. A structure according to claim 12 wherein said composition additionally contains a tar pitch.

21. A structure according to claim 12 wherein said glass powder is present in an amount of at least 10% by weight.

* * * * *

UNITED STATES PATENT AND TRADEMARK OFFICE
CERTIFICATE OF CORRECTION

PATENT NO. : 4,195,458
DATED : April 1, 1980
INVENTOR(S) : WALTER HOPPE, WINDECK-SCHLADERN; HANS JÜNGER AND FRANZ WEISSENFELS It is certified that error appears in the above–identified patent and that said Letters Patent are hereby corrected as shown below:

COLUMN 4, line 14, change "1.0" to -- 2.0 --

Signed and Sealed this

Twelfth Day of August 1980

[SEAL]

Attest:

SIDNEY A. DIAMOND

Attesting Officer     Commissioner of Patents and Trademarks